(12) United States Patent
Li

(10) Patent No.: US 11,817,806 B2
(45) Date of Patent: Nov. 14, 2023

(54) METHOD OF DETERMINING INITIAL SPEED FOR A SYNCHRONOUS MOTOR AND A CONTROLLER THEREFOR

(71) Applicant: Kinetic Technologies International Holdings LP, Toronto (CA)

(72) Inventor: Kwei Chung Li, Kowloon (HK)

(73) Assignee: Kinetic Technologies International Holdings LP, Toronto (CA)

( * ) Notice: Subject to any disclaimer, the term of this patent is extended or adjusted under 35 U.S.C. 154(b) by 173 days.

(21) Appl. No.: 17/462,917

(22) Filed: Aug. 31, 2021

(65) Prior Publication Data

US 2023/0062832 A1 Mar. 2, 2023

(51) Int. Cl.
*H02P 21/00* (2016.01)
*H02P 21/22* (2016.01)
*H02P 27/08* (2006.01)
*H02P 21/18* (2016.01)

(52) U.S. Cl.
CPC .............. *H02P 21/22* (2016.02); *H02P 27/08* (2013.01); *H02P 21/18* (2016.02)

(58) Field of Classification Search
CPC ................................. H02P 21/22; H02P 27/08
USPC ...................................................... 318/400.02
See application file for complete search history.

(56) References Cited

U.S. PATENT DOCUMENTS

| 10,361,648 | B2 | 7/2019 | Wang |
| 11,652,431 | B2 | 5/2023 | Okubayashi |
| 2007/0222220 | A1* | 9/2007 | Huang .................... F02N 11/04 290/31 |
| 2009/0128074 | A1* | 5/2009 | Hu ............................ H02P 6/21 318/696 |
| 2010/0320953 | A1* | 12/2010 | Yeh ......................... H02P 21/06 318/490 |
| 2013/0175955 | A1* | 7/2013 | Son ......................... H02P 21/14 318/400.02 |
| 2014/0239863 | A1 | 8/2014 | Melanson |

(Continued)

FOREIGN PATENT DOCUMENTS

| CN | 101977012 A | 2/2011 |
| CN | 102751937 A | 10/2012 |

(Continued)

OTHER PUBLICATIONS

PCT International Search Report and the Written Opinion dated Oct. 19, 2022, issued in related International Application No. PCT/CN2022/106535 (9 pages).

(Continued)

*Primary Examiner* — Erick D Glass
(74) *Attorney, Agent, or Firm* — Sheppard Mullin Richter & Hampton LLP

(57) ABSTRACT

Described is a method of determining an initial speed of a synchronous motor having a permanent magnet rotor. The method comprises controlling said motor to cause the rotor to rotate or observing that the rotor is rotating. The method includes sensing stator winding currents and transforming the sensed stator winding currents into a two-dimensional (2D) coordinate system using an alpha-beta ($\alpha$-$\beta$) transformation. The rotor angle $\theta$ is determined from an arc tangent (Atan) of the ratio of the current in the $\alpha$-axis to the current in the $\beta$-axis. The initial motor speed $\omega$ is determined from the determined rotor angle $\theta$.

16 Claims, 5 Drawing Sheets

(56) References Cited

U.S. PATENT DOCUMENTS

2017/0373618 A1* 12/2017 Miyazawa .............. H02P 6/182
2020/0007062 A1*  1/2020 Ghaderi ................... H02P 6/08

FOREIGN PATENT DOCUMENTS

| CN | 106911283 A  | 6/2017  |
|----|--------------|---------|
| CN | 111756288 A  | 10/2020 |
| CN | 111865164 A  | 10/2020 |
| CN | 112737450 A  | 4/2021  |
| EP | 2061147 A2   | 5/2009  |
| JP | 2001-095297 A | 4/2001 |
| JP | 2003-219682 A | 7/2003 |
| TW | 201830846 A  | 8/2018  |
| TW | 201834380 A  | 9/2018  |

OTHER PUBLICATIONS

Zambada, Jorge, "Sensorless Field Oriented Control of PMSM Motors", AN1078, Microchip Technology inc, 2007.
"Sensoriess PMSM Field-Oriented Control" DRM148, Freescale Semiconductor Inc., 2016.
Wei Xu et al., "Improved Rotor Flux Obseivor for Sensoriess Control of PMSM With Adaptive Harmonic Eiimination and Phase Compensation", CES Transactions, vol. 3, Jun. 2019.
"DRV10987 12-V to 24-V, Three-Phase, Senscrless BLDC Motor", Texas Instruments, Feb. 2018.
Torres, Daniel et al., "Single-Shunt Three-Phase Current Reconstruction Algorithm for Sensorless FOC of a PSMS", AN1299, Microchip Technology Inc., 2009.
Search Report dated May 26, 2023, issued in related Taiwan Patent Application No. 111130667 (2 pages).

* cited by examiner

METHOD OF DETERMINING INITIAL SPEED FOR A SYNCHRONOUS MOTOR AND A CONTROLLER THEREFOR

FIELD OF THE INVENTION

The invention relates to a method of determining initial speed for a synchronous motor and a controller therefor. The method relates particularly, but not inclusively to a method of determining initial speed and motor angle for a permanent magnet synchronous motor (PMSM) having a sensorless closed-loop control system for synchronous operation.

BACKGROUND OF THE INVENTION

The most common types of multi-phase, e.g., three-phase, motors are synchronous motors and induction motors. When three-phase electric conductors are placed in certain geometrical positions, which means at a certain angle from one another, an electrical field is generated. The rotating magnetic field rotates at a certain speed known as the synchronous speed. If a permanent magnet or electromagnet is present in this rotating magnetic field, the magnet is magnetically locked with the rotating magnetic field and consequently rotates at the same speed as the rotating field which results in a synchronous motor, as the speed of the rotor of the motor is the same as the speed of the rotating magnetic field.

A permanent magnet motor uses permanent magnets in the rotor to provide a constant magnetic flux which has a sinusoidal back-electromotive force (emf) signal. The rotor locks in when the speed of the rotating magnetic field in the stator is at or near synchronous speed. The stator carries windings which are connected to a controller having a power stage including a voltage supply, typically an alternating current (AC) voltage supply, to produce the rotating magnetic field. Such an arrangement constitutes a PMSM.

PMSMs are similar to brushless direct current (BLDC) motors. BLDC motors can be considered as synchronous DC motors which use a controller having a power stage including a DC voltage supply, suitably converted, to produce the stator rotating magnetic field. BLDC motors therefore use the same or similar control algorithms as AC synchronous motors, especially PMSM motors.

Previously, it has been common in synchronous motor control systems to use at least one sensor, such as a Hall sensor, to detect the rotational position of the rotor during synchronous operation. However, sensorless motor control systems are now preferred.

Such sensorless motor control systems typically include a rotor position and speed estimation module where, during synchronous operation, rotor position and speed can be continuously estimated based on the back-emf induced by the rotating rotor. The estimated rotor positions and speeds are utilized to update and/or compensate the motor control signals during synchronous operation thereby providing sensorless closed-loop synchronous operation motor control.

A known method of initial speed detection is described in the publication entitled "DRV10987 12-V to 24-V, Three-Phase, Sensorless BLDC Motor" by Texas Instruments August 2017, pages 27-28, the content of which is incorporated herein by reference. The method uses phase to phase comparators as illustrated in FIG. 1 to detect the zero crossings of the motor back-emf voltage while the motor is coasting. The motor outputs are in the high-impedance state. FIG. 1 shows the configuration of the comparators. If the UW comparator output is lagging the UV comparator output by 60°, the motor is spinning forward. If the UW comparator output is leading the UV comparator output by 60°, the motor is spinning in reverse. The motor speed is determined by measuring the time between two rising edges of the comparator outputs. If neither of the comparator outputs toggles for a given amount of time, the motor condition is defined as stationary. The disclosed known method determines that the initial state of the motor is spinning in the forward direction and measures the speed and position which are used to initialize the closed loop motor controller which can then transition directly into the closed-loop synchronous operation of the motor without needing to stop the motor.

One problem with the disclosed known method is that it requires additional circuitry in the form of the two high-voltage comparators because the back-emf of the motor induced by rotation of the rotor could be large. Furthermore, the resolution of the detected motor angle position is at best 60°. Also, the high-voltage comparators cannot be supported in a low voltage wafer fabrication process for the motor controller.

Among other things, what is therefore desired is an improved method of determining initial speed and/or motor angle for a synchronous motor.

OBJECTS OF THE INVENTION

An object of the invention is to mitigate or obviate to some degree one or more problems associated with known methods of determining an initial speed and/or motor angle for a synchronous motor.

The above object is met by the combination of features of the main claims; the sub-claims disclose further advantageous embodiments of the invention.

Another object of the invention is to provide an improved method of determining initial speed and/or motor angle for a PMSM having a sensorless closed-loop control system for synchronous operation.

Another object of the invention is to provide an improved method of starting a synchronous motor having a sensorless closed-loop control system for synchronous operation.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a method of determining an initial speed of a synchronous motor having a permanent magnet rotor. The method comprises controlling said motor to cause the rotor to rotate or observing that the rotor is rotating. The method includes sensing stator winding currents and transforming the sensed stator winding currents into a two-dimensional (2D) coordinate system using an alpha-beta ($\alpha$-$\beta$) transformation. The rotor angle $\theta$ is determined from an arc tangent (Atan) of the ratio of the current in the $\alpha$-axis to the current in the $\beta$-axis. The initial motor speed $\omega$ is determined from the determined rotor angle $\theta$.

In a second main aspect, the invention provides a method of determining an initial speed of a synchronous motor having a permanent magnet rotor, the method comprising: controlling said motor to cause the rotor to rotate or observing that the rotor is rotating; sensing stator winding currents;

transforming the sensed stator winding currents into a two-dimensional (2D) coordinate system using an alpha-beta (α-β) transformation; determining the rotor angle θ from an arc tangent (Atan) of the ratio of the current in the α-axis to the current in the β-axis; and determining an initial speed ω of the motor from the determined rotor angle θ.

In a third main aspect, the invention provides a closed-loop method of starting a synchronous motor having a permanent magnet rotor, the method comprising the steps of: controlling said motor to cause the rotor to rotate or observing that the rotor is rotating; sensing stator winding currents; transforming the sensed stator winding currents into a two-dimensional (2D) coordinate system using an alpha-beta (α-β) transformation; determining the rotor angle θ from an arc tangent (Atan) of the ratio of the current in the α-axis to the current in the β-axis; determining an initial speed ω of the motor from the determined rotor angle θ; and switching-over control of the motor to a closed-loop synchronous operation motor control algorithm once the initial motor speed has been determined.

In a fourth main aspect, the invention provides a closed-loop controller for a motor, said controller comprising a non-transitory computer-readable medium storing machine-readable instructions and a processor, wherein, when the machine-readable instructions are executed by said processor, they configure the controller to start a synchronous motor having a permanent magnet rotor and stator windings in accordance with the method of the third main aspect of the invention.

In a fifth main aspect, the invention provides a synchronous motor including a closed loop controller according to the fourth main aspect of the invention.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
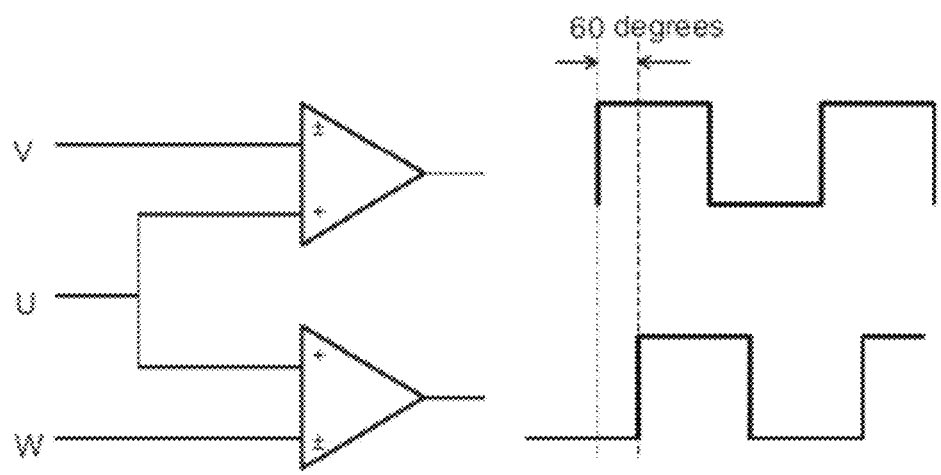
FIG. 1 is a schematic diagram of a comparator circuit for the known method of determining an initial speed of a synchronous motor.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS. may be implemented in various forms of hardware, software, or combinations thereof. These elements may be implemented in a combination of hardware and software on one or more appropriately programmed general-purpose devices, which may include a processor, a memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode, or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

References herein to "rotor angle" are to be taken as references to "rotor position". References herein to "stator angle" are to be taken as references to "commutation angle".

The method according to the invention determines the motor angle and initial speed directly from the stator winding currents/voltages. However, in the following description reference will be made to only stator currents.

The method of determining the motor angle and/or initial speed directly from the stator winding currents can comprise a first part of a control algorithm for starting and operating the synchronous motor. The invention therefore also relates to a method of and controller for starting a PMSM having a sensorless closed-loop controller for synchronous operation, but the method is applicable to any synchronous motor with a closed-loop controller for synchronous operation which utilizes the method as hereinafter described.

One advantage of the invention is that it can be implemented on an existing closed-loop controller for synchronous operation without significant modification save for changes in the controller's control algorithm or algorithms. The closed-loop control algorithm in accordance with the invention can be implemented by software, firmware, hardware, or any combination of the foregoing. It may be embodied as an application specific integrated circuit or chip.

Figure 2:
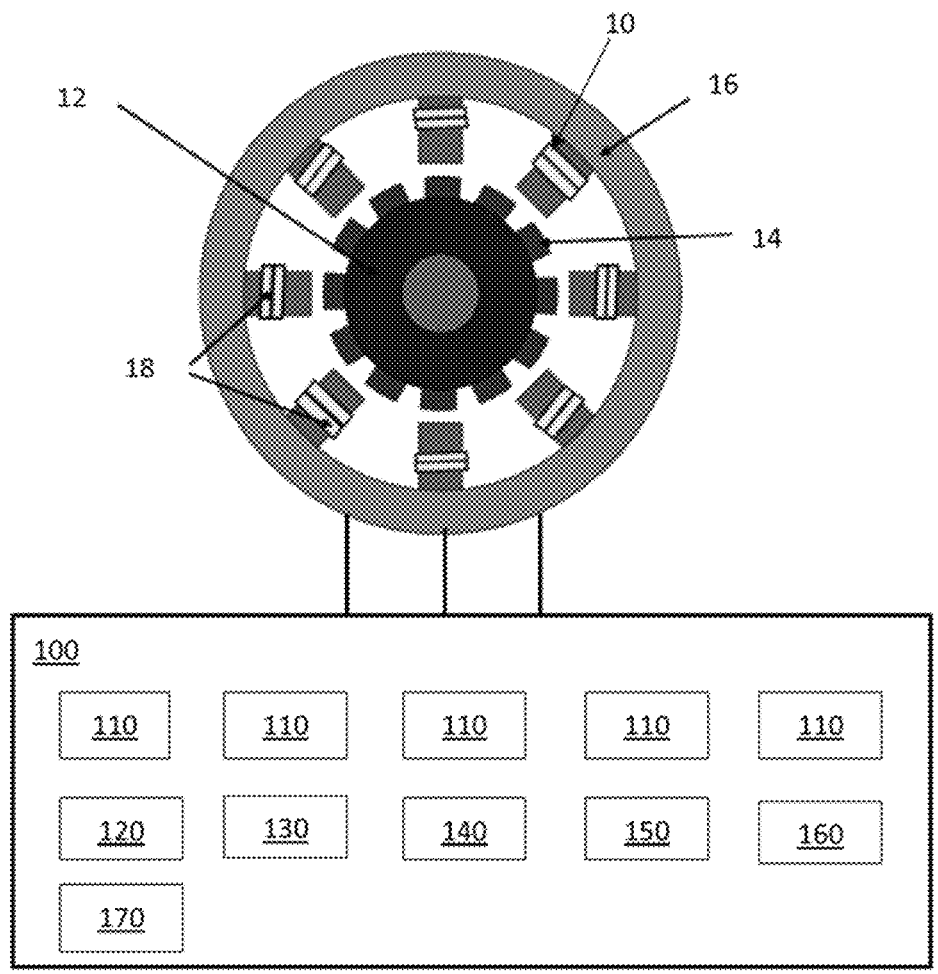
FIG. 2 is a block schematic diagram illustrating a synchronous motor with a closed-loop controller in accordance with the invention.

FIG. 2 shows an exemplary embodiment of an improved closed-loop controller 100 for a synchronous motor 10 in accordance with concepts of the present invention. The synchronous motor 10 has a permanent magnet rotor 12 with a plurality of permanent magnets 14 and a stator 16 with a plurality of stator windings 18. Whilst the synchronous motor 10 is shown with the stator 16 surrounding the rotor 12 in a conventional manner, it will be understood that the concepts of the present invention are equally applicable to a synchronous motor where the rotor surrounds the stator, i.e., the stator is arranged internally of the rotor.

In the illustrated embodiment, the closed-loop controller 100 may comprise a plurality of functional blocks 110 for performing various functions thereof. For example, the closed-loop controller 100 may comprise a suitably modified or suitably configured known vector-based closed-loop controller such as a direct torque control (DTC) closed-loop controller or a Field Oriented Control (FOC) closed-loop controller as described in the publication entitled "Sensorless Field Oriented Control of PMSM Motors" authored by Jorge Zambada, published by Microchip Technology Inc. in 2007 as paper AN1078, the content of which is incorporated herein by way of reference, and as illustrated in FIG. 3 herein but modified as described herein in accordance with the concepts of the invention.

The closed-loop controller 100 may, for example, be implemented using logic circuits and/or executable code/machine readable instructions stored in a memory for execution by a processor 120 to thereby perform functions as described herein. For example, the executable code/machine readable instructions may be stored in one or more memories 130 (e.g., random access memory (RAM), read only memory (ROM), flash memory, magnetic memory, optical memory, or the like) suitable for storing one or more instruction sets (e.g., application software, firmware, operating system, applets, and/or the like), data (e.g., configuration parameters, operating parameters and/or thresholds, collected data, processed data, and/or the like), etc. The one or more memories 130 may comprise processor-readable memories for use with respect to one or more processors 120 operable to execute code segments of the closed-loop controller 100 and/or utilize data provided thereby to perform functions of the closed-loop controller 100 as described herein. Additionally, or alternatively, the closed-loop controller 100 may comprise one or more special purpose processors (e.g., application specific integrated circuit (ASIC), field programmable gate array (FPGA), graphics processing unit (GPU), and/or the like configured to perform functions of the closed-loop controller 100 as described herein.

Figure 3:
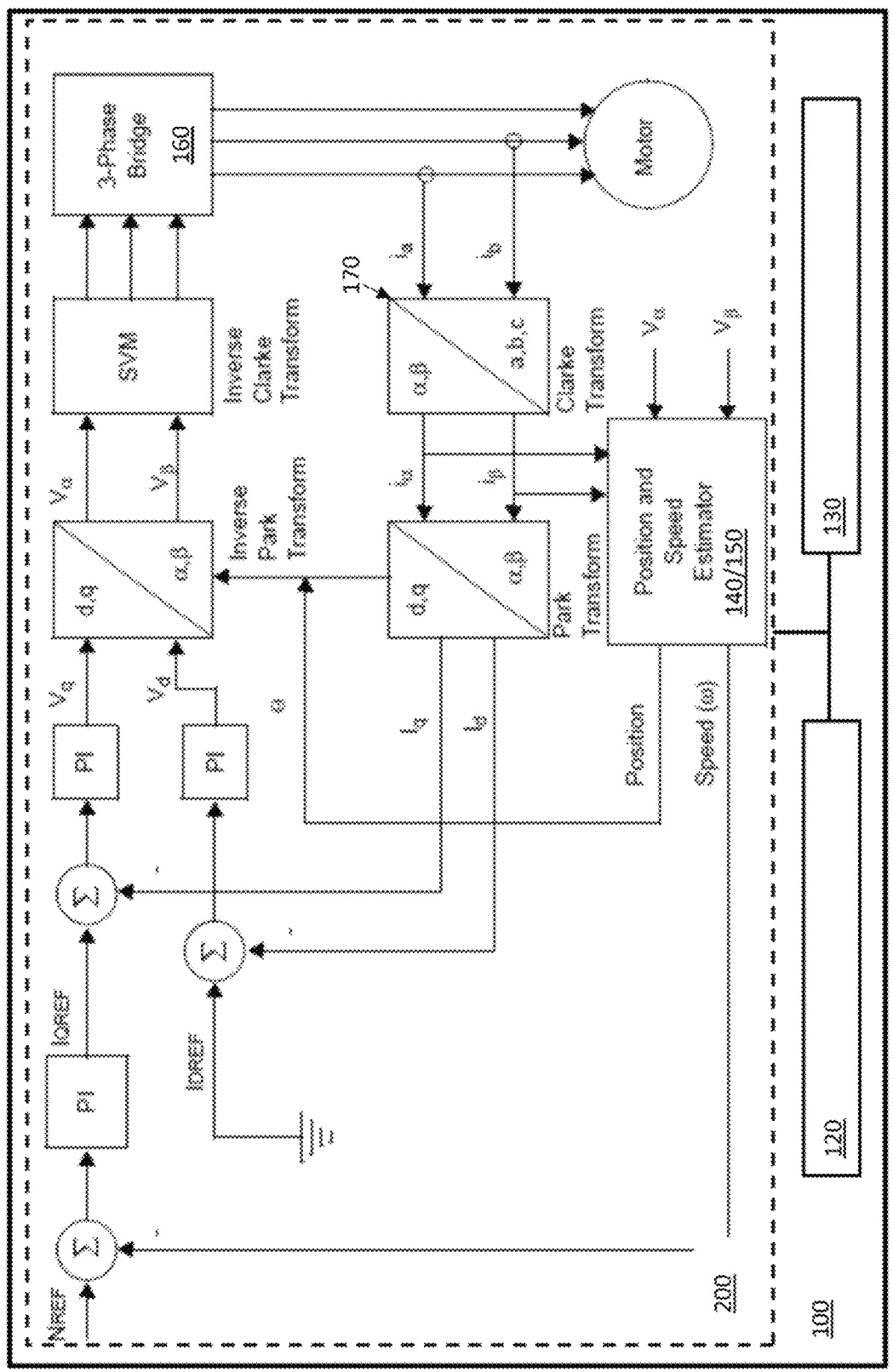
FIG. 3 is a detailed block schematic diagram of an embodiment of the closed-loop controller in accordance with the invention.

In a broad aspect, the invention comprises using the closed-loop controller 100 of FIGS. 2 and 3, e.g., using the modified FOC controller 200 of FIG. 3, to implement the method of determining the motor angle and/or initial speed directly from the stator winding currents. The closed-loop controller 100 may, as mentioned above, comprise any known, suitable closed-loop controller for synchronous operation and may comprise the FOC controller 200 as described in "Sensorless Field Oriented Control of PMSM Motors" of paper AN1078 or as described in the publication entitled "Sensorless PMSM Field-Oriented Control", the FOC controller 200 being suitably modified or reconfigured to implement the method of determining the motor angle and/or initial speed directly from the stator winding currents.

In another broad aspect, a closed-loop method of starting a synchronous motor comprises first determining the motor angle and/or initial speed directly from the stator winding currents and then switching-over control of the motor to the closed-loop synchronous operation motor control algorithm once the initial speed has been determined.

The present invention therefore also seeks to supplement the known closed-loop method for operating a synchronous motor, especially a PMSM, by the method of determining the motor angle and/or initial speed directly from the stator winding currents as one or more inputs to the closed-loop operation method on motor start-up.

The modified or reconfigured closed-loop controller 100/200 of FIGS. 2 and 3 is arranged to start the synchronous motor 10 having a permanent magnet rotor 12 and stator windings 18 by energizing the stator windings 18 using motor control signals based on or derived from the determined motor angle and/or initial speed derived directly from the stator winding currents to thereby cause rotation of the rotor 12 up to its synchronous speed without stopping the rotor.

In one embodiment, however, after synchronous operation of the motor, an initial standstill rotor angle on initiation of motor start-up may comprise a predetermined parked rotor angle. The predetermined parked rotor angle may be obtained when stopping the motor 10 after a preceding synchronous operation of the motor 10. The predetermined parked rotor angle may be obtained where, when the motor is stopped, the closed-loop controller 100/200 is configured to park the rotor 12 at a predetermined rotor angle. The predetermined rotor angle can be stored in the memory 130 and recalled when needed on initiation of start-up of the motor 10.

In some embodiments, the module 140 may comprise a rotor position and speed estimation module 140 of the modified FOC controller 200 of FIG. 3 and the initial rotor position determined in accordance with the invention may comprise an input to the module 140.

In some embodiments, the module 140 may comprise a rotor flux observer module 150 of a type as described in pages 1-3 of the publication entitled "improved Rotor Flux Observer for Sensorless Control of PMSM With Adaptive Harmonic Elimination and Phase Compensation" authored by Wei Xu et al, CES Transactions on Electrical Machines and Systems, vol. 3, no. 2, June 2019, the content of which is herein incorporated by reference.

The closed-loop motor operating method according to the invention can be utilized in synchronous motors 10 with various stator winding configurations as illustrated by FIGS. 4-9.

Figure 4:
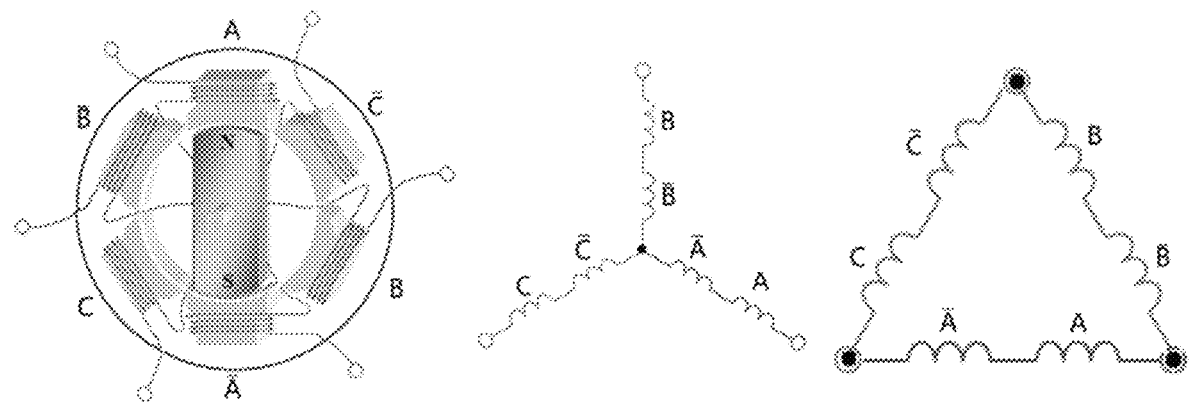
FIG. 4 is a schematic diagram showing the delta and star (or Y) stator windings configurations of a synchronous motor in which the closed-loop start-up method in accordance with the invention can be implemented.
Figure 5:
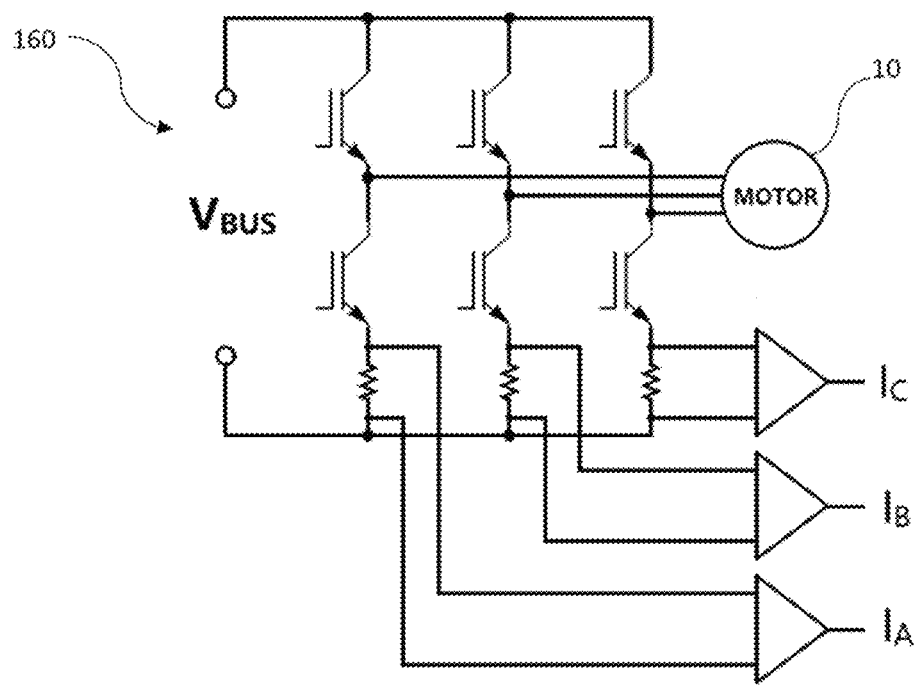
FIG. 5 is a schematic block diagram of a power stage for the closed-loop motor control system in accordance with the invention for the synchronous motor of FIG. 4.

FIG. 4 is a schematic diagram showing the conventional delta and star (or Y) stator windings configurations of the synchronous motor 10 whilst FIG. 5 provides a schematic block diagram of a 3-phase power stage/bridge 160 for the closed-loop controller 100/200 for the synchronous motor 10 of FIG. 5. Two or more of the outputs of the 3-phase bridge module 160 of the closed-loop controller 100/200 of FIG. 4 comprising two or more of the sensed currents denoted as "$I_A$", "$I_B$" and "$I_C$" in FIG. 13 are fed to the Clarke Transform module 170 of the closed-loop controller 100/200 for processing. Typically, the sensed currents "$I_A$", "$I_B$" are selected for the Clarke Transform module 170.

Figure 6:
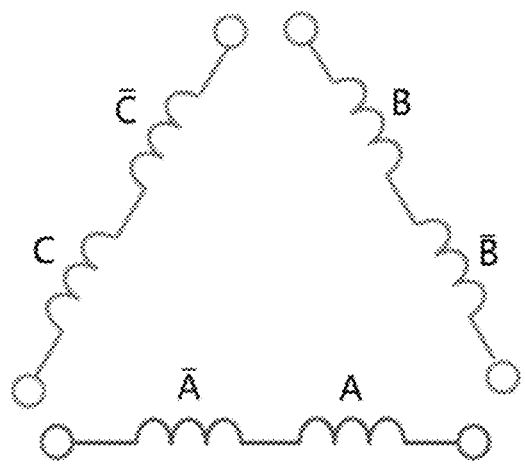
FIG. 6 is a schematic diagram showing a six-wire configuration of stator windings of a synchronous motor in which the closed-loop start-up method in accordance with the invention can be implemented.
Figure 7:
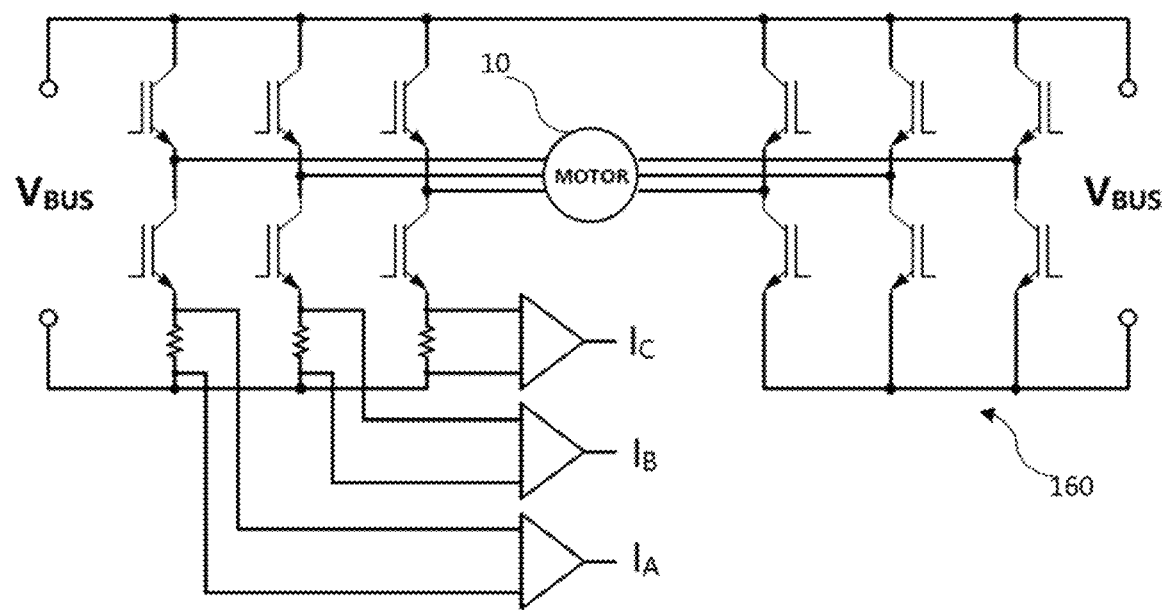
FIG. 7 is a schematic block diagram of a power stage for the closed-loop motor control system in accordance with the invention for the synchronous motor of FIG. 6.

In contrast to FIG. 4, FIG. 6 provides a schematic diagram showing a six-wire configuration of the stator windings 18 of the synchronous motor 10 whilst FIG. 7 provides a schematic block diagram of a 3-phase power stage/bridge 160 for the closed-loop controller 100/200 for the synchronous motor 10 with this stator winding configuration. The six-wire stator winding configuration results from none of the three stator windings 18 having any common connection points in contrast to the conventional delta or star stator winding configurations of FIG. 4 which have at least one common connection point between at least two of the stator windings 18.

Figure 9:
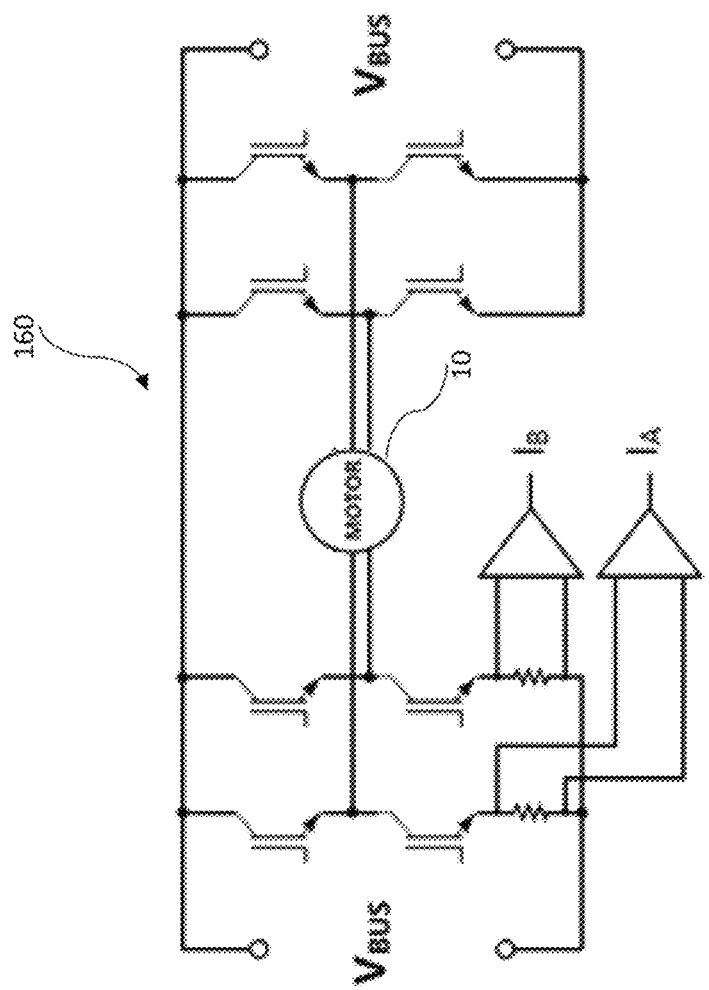
FIG. 9 is a schematic block diagram of a power stage for the closed-loop motor control system in accordance with the invention for the synchronous motor of FIG. 8.
Figure 8:
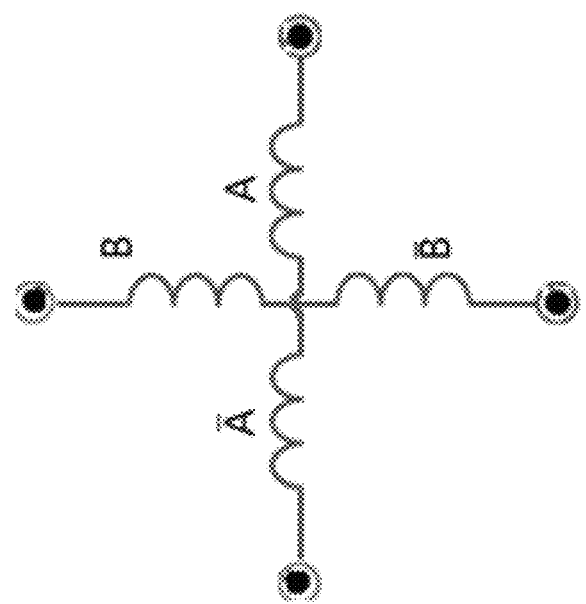
FIG. 8 is a schematic diagram showing a four-wire configuration of stator windings of a synchronous motor in which the closed-loop start-up method in accordance with the invention can be implemented.

FIG. 8 provides a schematic diagram showing a four-wire configuration of 2-phase stator windings 18 of the synchronous motor 10 in which the closed-loop start-up method in accordance with the invention can be implemented. FIG. 9 provides a schematic block diagram of a power stage/bridge 160 for the closed-loop motor controller 100/200 in which the sensed currents "$I_A$", "$I_B$" are fed into the Clarke Transform module.

More specifically, the method of the invention first determines a motor angle 9 of the synchronous motor 10 by controlling said motor 10 to cause the rotor 12 to rotate. Alternatively, the rotor 12 may be caused to rotate by an external force and, in such a case, no voltage is applied to energize the stator windings 18 to cause rotation of the rotor 12 as it is being caused to rotate by the external force. In either case, the rotation of the rotor 12 induces back-emf currents in the stator windings 18. The method includes sensing the back-emf currents induced in the stator windings 18. This may be easily and conveniently done by sensing said currents using existing current sensing resistors of the closed-loop motor controller 100/200 as seen in FIGS. 3, 5, 7 & 9. Consequently, the method of the invention may be implemented by the closed-loop motor controller 100/200 without requiring any physical circuit reconfiguration of said closed-loop motor controller 100/200. It is sufficient to modify only the operating instructions of the closed-loop motor controller 100/200 to implement the method of the invention. There are a number of ways to sense or measure the line currents of the stator windings 18 and at least one suitable way is disclosed in pages 1-2 of the publication entitled "Single-Shunt Three-Phase Current Reconstruction Algorithm for Sensorless FOC of a PSMS" authored by Daniel Torres and Jorge Zambada, published by Microchip Technology Inc. in 2009 as paper AN1299, the content of which is incorporated herein by way of reference.

The method includes transforming the sensed stator winding currents into a two-dimensional (2D) coordinate system using an alpha-beta ($\alpha$-$\beta$) transformation such as a Clarke transformation in the Clarke Transform module 170 of the closed-loop motor controller 100/200. The rotor angle $\theta$ can be determined directly from the sensed or measured stator winding currents from an arc tangent (Atan) of the ratio of the current in the $\alpha$-axis to the current in the $\beta$-axis. The resulting rotor angle $\theta$ is taken as comprising the motor angle.

Vector control of a synchronous motor can be summarized as follows:

(i) The 3-phase stator currents are measured. These measurements typically provide values for $i_a$ and $i_b$, $i_c$ is calculated because $i_a$, $i_b$ and $i_c$ have the following relationship:

$$i_a + i_b + i_c = 0.$$

(ii) The 3-phase currents are converted to a two-axis system. This conversion provides the variables $i_\alpha$ and $i_\beta$ from the measured $i_a$ and $i_b$ and the calculated $i_c$ values. $i_\alpha$ and $i_\beta$ are time-varying quadrature current values as viewed from the perspective of the stator, i.e., a two-dimensional stationary orthogonal reference frame or coordinate system.

(iii) The two-axis coordinate system is rotated to align with the rotor flux using a transformation angle calculated at the last iteration of the control loop. This conversion provides the $I_d$ and $I_q$ variables from $i_\alpha$ and $i_\beta$. $I_d$ and $I_q$ are the quadrature currents transformed to the rotating coordinate system, a two-dimensional rotating orthogonal reference frame or coordinate system. For steady state conditions, $I_d$ and $I_q$ are constant.

(iv) Error signals are formed using $I_d$, $I_9$ and reference values for each.

The $I_d$ reference controls rotor magnetizing flux.

The $I_q$ reference controls the torque output of the motor.

The error signals are input to Pt controllers.

The output of the controllers provide $V_d$ and $V_q$, which is a voltage vector that will be sent to the motor.

(v) A new transformation angle is estimated where $v_\alpha$, $v_\beta$, $i_\alpha$ and $i_\beta$ are the inputs. The new angle guides the FOC algorithm as to where to place the next voltage vector.

(vi) The $V_d$ and $V_q$ output values from the PI controllers are rotated back to the stationary reference frame using the new angle. This calculation provides the next quadrature voltage values $v_\alpha$ and $v_\beta$.

(vii) The $v_\alpha$ and $v_\beta$ values are transformed back to 3-phase values $v_a$, $v_b$ and $v_c$. The 3-phase voltage values are used to calculate new PWM duty cycle values that generate the desired voltage vector. The entire process of transforming, PI iteration, transforming back and generating PWM is schematically illustrated in FIG. 3.

It is not necessary in all embodiments to sense or measure all of the stator winding currents. For example, in the case of FIGS. 5 & 7, since $I_A+I_B=I_C$, it is only necessary to sense or measure two of the three stator winding currents as the third non-sensed or not measured stator winding current can be determined from the other two sensed or measured stator winding currents.

Preferably, for clockwise rotation of the rotor 12, the Atan of the ratio of the current in the α-axis to the current in the β-axis comprises: $\theta=\text{Atan}(i_\alpha/-i_\beta)$, where θ is the rotor angle.

Preferably, for anti-clockwise rotation of the rotor 12, the Atan of the ratio of the current in the α-axis to the current in the β-axis comprises: $\theta=180°+\text{Atan}(i_\alpha/-i_\beta)$, where θ is the rotor angle.

The forgoing Atan relationships are derived as follows. For rotor flux Φ in the αβ axis, the rotor flux Φ can be estimated as follows:

$$\Phi_\alpha = \int (v_\alpha - ri_\alpha)dt - li_\alpha$$

and $$\Phi_\beta = \int (v_\beta - ri_\beta)dt - li_\beta$$

where r comprises motor stator winding resistance and l comprises motor stator winding inductance.

If we assume that the motor inductance is small, then the values of $li_\alpha$ and $li_\beta$ can be ignored. Furthermore, in the case of initial rotation detection, no voltage may be applied to the motor 10 therefore $v_\alpha$ and $v_\beta$ are zero. This is because initial rotation of the rotor may be caused by an external physical force, e.g., manually turned or wind-blown in the case of a fan or the like, or by, for example, inertia following switching-off of the drive signals for the motor. Hence, this provides:

$$\Phi_\alpha = -r\int i_\alpha dt$$

and $$\Phi_\beta = -r\int i_\beta dt.$$

Assuming that the rotor 12 is rotated at a constant angular speed then angular speed and rotor flux Φ in the αβ axis can be expressed as:

$$\frac{d\theta}{dt} = \omega, \quad \Phi_\alpha = F\cos\theta, \quad \Phi_\beta = F\sin\theta$$

where F is the magnitude of the rotor flux Φ and θ is the rotor angle from the α axis. It is then possible to rewrite the rotor flux Φ in the αβ axis as:

$$\Phi_\alpha = -\frac{r}{\omega}\int i_\alpha d\theta$$

and $$\Phi_\beta = -\frac{r}{\omega}\int i_\beta d\theta.$$

By differentiating the rotor flux Φ in the αβ axis, this provides:

$$\frac{d\Phi_\alpha}{d\theta} = -F\sin\theta = -\frac{ri_\alpha}{\omega}$$

and $$\frac{d\Phi_\beta}{d\theta} = F\cos\theta = -\frac{ri_\beta}{\omega}.$$

From this, the rotor angle θ can be determined or calculated as follows:

$$\theta = A\tan\left(\frac{\sin\theta}{\cos\theta}\right) = A\tan\left(\frac{-\frac{d\Phi_\alpha}{dt}}{\frac{d\Phi_\beta}{dt}}\right) = A\tan\left(\frac{\frac{ri_\alpha}{\omega}}{-\frac{ri_\beta}{\omega}}\right).$$

Thus, rotor angle θ equals:

$$A\tan\left(\frac{\text{sign}(\omega)i_\alpha}{-\text{sign}(\omega)i_\beta}\right)$$

where sign(ω) is positive when the rotor 12 is rotating anti-clockwise and sign(ω) is negative when the rotor 12 is rotating clockwise.

The method may include determining the initial speed ω of the motor 10 from the determined rotor angle θ. The initial speed a of the motor may be determined from the determined rotor angle θ using the relationship:

$$\omega = \frac{\theta'(n) - \theta'(n-1)}{t}$$

where n is the nth time period, θ' is the determined rotor angle and w is the motor speed. Preferably, the method includes correcting the determined rotor angle θ based on the determined motor speed ω using the relationships:

θ"=θ' where the sign of ω=+1; and

θ"=180°+θ' where the sign of ω=−1.

Preferably also, the method includes using a low pass filter (LPF) to filter the determined rotor angle θ to remove any system noise such that θ'=LPF(θ).

In another aspect of the method of the invention, the method comprises a closed-loop method of starting the synchronous motor 10, the method comprising determining the rotor angle θ in accordance with the method of the invention, determining an initial speed a of the motor from the determined rotor angle θ and then switching-over control of the motor 10 to the closed-loop motor controller 100/200 once the initial motor speed cv has been determined.

The present invention also provides a non-transitory computer-readable medium storing machine-readable instructions, wherein, when the machine-readable instructions are executed by the processor of the closed-loop motor controller 100/200, they configure the processor to implement the concepts of the present invention.

In the present invention, by ignoring the motor inductance (I), it is possible to determine the rotor θ angle and initial motor speed ω without the need to model the motor in the way that known motor angle estimators do.

The closed-loop motor controller 100/200 of the invention does not require additional circuitry such as high-voltage comparators. Furthermore, the closed-loop motor controller 100/200 of the invention much better resolution of the detected motor angle position than 60°. The closed-loop motor controller 100/200 of the invention can be fabricated by a low voltage wafer fabrication process such as a 3.3 volt wafer fabrication process.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of determining a rotor angle of a synchronous motor having a rotor and a stator having windings, the method comprising:
   sensing currents in the windings of the stator while the rotor is rotating;
   transforming the currents into a two-dimensional (2D) coordinate system using an alpha-beta ($\alpha$-$\beta$) transformation, wherein the alpha-beta ($\alpha$-$\beta$) transformation is a Clarke transformation, the 2D coordinate system having an $\alpha$-axis and a $\beta$-axis; and
   determining a rotor angle $\theta$ from an arc tangent (Atan) of a ratio of a current $i_\alpha$ in the $\alpha$-axis to a current $i_\beta$ in the $\beta$-axis.

2. The method of claim 1, wherein, for clockwise rotation of the rotor, the rotor angle $\theta$ is determined using the relationship:

$$\theta = \text{Atan}(i_\alpha / -i_\beta)$$

3. The method of claim 1, wherein, for anti-clockwise rotation of the rotor, the rotor angle $\theta$ is determined using the relationship:

$$\theta = 180° + \text{Atan}(i_\alpha / -i_\beta)$$

4. The method of claim 1, further comprising: sensing some but not all of the currents in the windings of the stator.

5. The method of claim 1, wherein sensing the currents in the windings of the stator comprises: sensing the currents in the windings of the stator using existing current sensing resistors of an existing closed loop controller for synchronous operation of the motor.

6. The method of claim 1, wherein the method is implemented by an existing closed loop controller for synchronous operation of the motor without requiring any physical circuit reconfiguration of the closed loop controller.

7. The method of claim 1, further comprising: determining an initial speed w of the motor from the determined rotor angle $\theta$.

8. The method of claim 7, wherein the initial speed $\omega$ of the motor is determined using the relationship:

$$\omega = \frac{\theta'(n) - \theta'(n-1)}{t}$$

where n is an nth time period and $\theta'$ is the determined rotor angle.

9. The method of claim 8, further comprising: determining a corrected rotor angle $\theta''$ based on the determined initial motor speed w using the relationships:

$$\theta'' = \theta'$$

where the sign of $\omega = +1$; and $$\theta'' = 180° + \theta'$$

where the sign of $\omega = -1$.

10. The method of claim 7, further comprising: removing any system noise by filtering the determined rotor angle $\theta'$ using a low pass filter.

11. The method of claim 7, wherein one or both of the determined rotor angle $\theta'$ and the determined initial motor speed $\omega$ comprise inputs to a closed loop controller for synchronous operation of the motor.

12. A method of determining an initial speed of a synchronous motor having a rotor and a stator having windings, the method comprising:
  sensing currents in the windings of the stator while the rotor is rotating;
  transforming the currents into a two-dimensional (2D) coordinate system using an alpha-beta (α-β) transformation, wherein the alpha-beta (α-β) transformation is a Clarke transformation, the 2D coordinate system having an α-axis and a β-axis;
  determining a rotor angle θ from an arc tangent (Atan) of a ratio of a current $i_α$ in the α-axis to a current $i_β$ in the β-axis; and
  determining an initial speed ω of the motor from the determined rotor angle θ.

13. A closed-loop method of starting a synchronous motor having a rotor and a stator having windings, the method comprising the steps of:
  sensing currents in the windings of the stator while the rotor is rotating;
  transforming the currents into a two-dimensional (2D) coordinate system using an alpha-beta (α-β) transformation, wherein the alpha-beta (α-β) transformation is a Clarke transformation, the 2D coordinate system having an α-axis and a β-axis;
  determining a rotor angle θ from an arc tangent (Atan) of a ratio of a current $i_α$ in the α-axis to a current $i_β$ in the β-axis;
  determining an initial speed ω of the motor from the determined rotor angle θ; and
  switching-over control of the motor to a closed-loop synchronous operation motor control algorithm once the initial speed ω of the motor has been determined.

14. A method of determining a motor angle of a synchronous motor having a rotor and a stator having windings, the method comprising:
  sensing currents in the windings of the stator while the rotor is rotating;
  transforming the currents into a two-dimensional (2D) coordinate system using an alpha-beta (α-β) transformation, wherein the alpha-beta (α-β) transformation is a Clarke transformation, the 2D coordinate system having an α-axis and a β-axis;
  determining a rotor angle from an arc tangent (Atan) of a ratio of a current $i_α$ in the α-axis to a current $i_β$ in the β-axis; and
  determining an initial speed ω of the motor from the determined rotor angle, the initial speed ω of the motor being determined from the determined rotor angle using the relationship:

$$ω=θ'(n)-θ'(n-1)/t$$

where n is the nth time period and θ' is the determined rotor angle.

15. A method of determining a motor angle of a synchronous motor having a rotor and a stator having windings, the method comprising:
  sensing stator winding currents while the rotor is rotating;
  transforming the sensed stator winding currents into a two-dimensional (2D) coordinate system using an alpha-beta (α-β) transformation;
  determining the rotor angle from an arc tangent (Atan) of the ratio of the current in the α-axis to the current in the β-axis;
  determining an initial speed ω of the motor from the determined rotor angle; and
  removing any system noise by filtering the determined rotor angle using a low pass filter.

16. A method of determining a motor angle of a synchronous motor having a rotor and a stator having windings, the method comprising:
  sensing stator winding currents while the rotor is rotating;
  transforming the sensed stator winding currents into a two-dimensional (2D) coordinate system using an alpha-beta (α-β) transformation;
  determining the rotor angle from an arc tangent (Atan) of the ratio of the current in the α-axis to the current in the β-axis; and
  determining an initial speed ω of the motor from the determined rotor angle;
  wherein one or both of the determined rotor angle and the determined initial motor speed ω comprise inputs to a closed loop controller for synchronous operation of the motor.

* * * * *